July 14, 1936.  O. WITTEL  2,047,241

TRIPOD HEAD

Filed July 21, 1933

Otto Wittel, Inventor;

Newton M. Perrins

George A. Gillette, Jr.

By

Attorneys

Patented July 14, 1936

2,047,241

UNITED STATES PATENT OFFICE 2,047,241

TRIPOD HEAD

Otto Wittel, Rochester, N. Y., assignor to Eastman Kodak Company, Rochester, N. Y., a corporation of New York Application July 21, 1933, Serial No. 681,509

5 Claims. (Cl. 248—183)

The present invention relates to an improvement in a tripod head construction and more particularly to a tripod head having a plurality of members which are relatively rotatable about transverse axes.

It is well known to provide tripod heads for universal movement of the supported apparatus either by use of a universal joint or arranging the members for rotation about a vertical axis and a horizontal axis. It has also been previously known to provide tightening means for adjusting the friction drag between the various members. Such tightening means, however, are generally objectionable in that the friction drag between the members varies upon relative movement or rotation of the tripod head members with respect to each other.

The primary object of the present invention is the provision in the rotatable joint of a tripod head of a connecting means by which the friction drag may be controlled, but will not be altered by rotation of the tripod head members with respect to each other.

Another object of the present invention is the provision in a tripod head of a friction drag which comprises a plurality of friction elements arranged in surface contact with each other between the relatively movable members.

A still further object of the present invention is the provision in a tripod head of a connecting means for varying the friction drag between relatively movable members of the tripod head and including a threaded spindle engaging a nut member which is attached to one of the tripod head members so that relative rotation of said head members does not change the relative axial positions of said spindle and nut member.

Other and further objects of the present invention will be suggested to those skilled in the art in connection with the description of the invention with reference to the accompanying drawing.

The above and other objects of the invention are embodied in a tripod head having a pair of relatively movable members and a plurality of metal elements and friction elements alternately arranged in frictional engagement with each other and with said members, in combination with a threaded connection having one part attached to one of said movable members whereby the friction drag between said friction elements does not vary upon relative rotation of said movable members.

Reference is hereby made to the drawing in which similar reference characters designate similar elements and in which.

Figure 1:
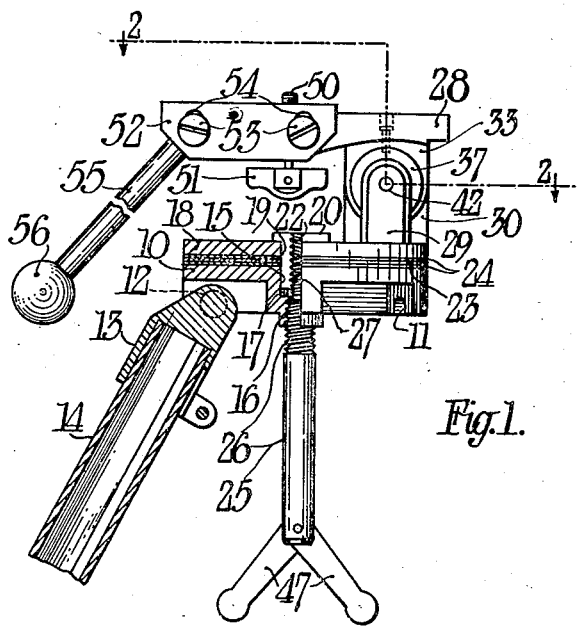
Fig. 1 is a side elevation of the tripod head according to the invention with a partial section for better illustration of the differential tightening means for the vertical axis.
Figure 2:
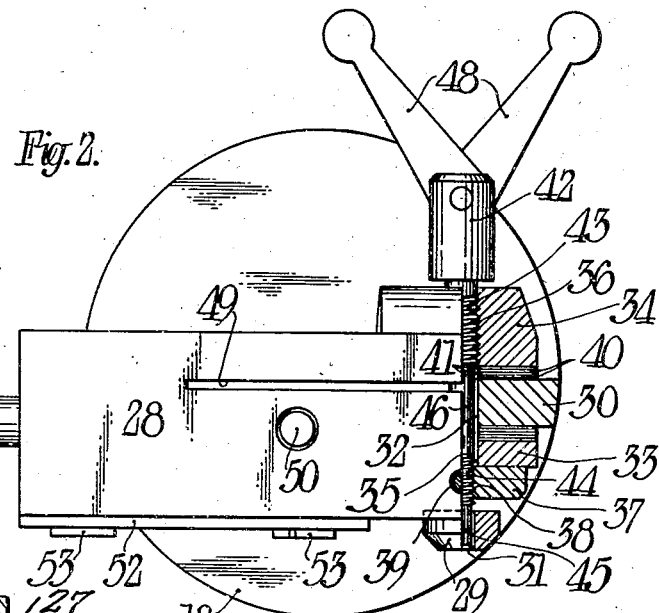
Fig. 2 is a plan view of the tripod head according to the invention with a partial section taken on the line 2—2 of Fig. 1.
Figure 3:
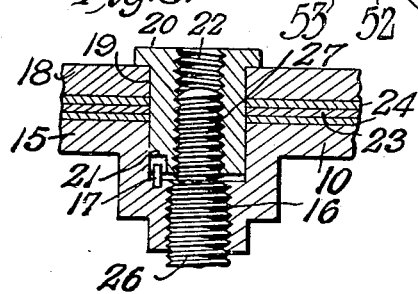

Fig. 3 is a cross section through plates 10 and 18 and through nut member 20 particularly to illustrate the interengagement between pin 17 on head plate 10 and notch 21 in nut member 20.

In the illustrated embodiment of the invention, the tripod head is composed of three principal members which may be taken in pairs, the members of each pair being movable with respect to each other about an axis. A head plate 10 is provided with a plurality of bearings 11 for engagement with the trunnions 12 of the head 13 on leg 14. The head plate 10 is provided with an axial opening 15 which has a threaded portion 16. A pin 17 is mounted in head plate 10 and extends into said axial opening 15 in a vertical position for a purpose that will be later described.

The top plate 18 is also provided with an axial opening 19. A nut member 20, located within axial openings 15 and 19, is provided with a notch 21, see Fig. 3, which is adapted to receive the pin 17 of head plate 10, and is provided with a threaded portion 22 which is of the same hand but of different pitch from the threaded portion 16 on the head plate 10.

A plurality of friction elements are arranged in surface contact with each other between head plate 10 and top plate 18. These friction elements may comprise a metal disk 23 which is located between head plate 10 and top plate 18 and may comprise a pair of friction disks 24, one of which is located between head plate 10 and metal disk 23 and the other of which is located between metal disk 23 and top plate 18. The friction disks 24 may be composed of any suitable friction material, such as fiber, leather, or rubber composition, but fiber is preferred.

A spindle 25 has a threaded portion 26 which corresponds to the threaded portion 16 of head plate 10 and has a threaded portion 27 which is of the same hand but different pitch from threaded portion 26 and which corresponds to the threaded portion 22 of nut member 20.

The several members of the lower joint for the tripod head can be readily assembled in the following manner. The spindle 25 with its threaded portion 26 is completely screwed into the threaded bore 16 of head plate 10. The nut member 20 is then screwed onto the threaded portion 27 of the spindle by turning the nut member with respect to the spindle. When the nut member 20 has been threaded along portion 27 so that the bottom of nut member 20 strikes the top of pin 17, then the notch 21 is brought into registry with pin 17 and the spindle 25 is rotated in a lefthand direction to draw nut member 20 toward head plate 10 at a differential rate corresponding to the difference in pitch of threaded portions 26 and 27. This manner of assembling the lower joint of the tripod demonstrates the advantage of the pin and notch connection between head plate 10 and nut member 20 by way of facilitating assembly of the structure. Performing these operations in the reverse order will permit ready dismantling of the lower tripod head joint.

The connecting means between the pairs of members of the tripod for regulating the friction drag upon relative movement of the movable members in a pair may be provided in other forms, one of which is illustrated with respect to the joint between top plate 18 and mounting plate 28. Supports 29 and 30 are attached to top plate 18 and are provided with axial openings 31 and 32, respectively. Supporting lugs 33 and 34 are mounted in spaced relation upon the undersurface of mounting plate 28. Supporting lug 33 has an axial hole 35 while supporting lug 34 is provided with a thread 36 of definite pitch and hand.

A nut member 37 is provided with a threaded portion 38 of the same hand but of slightly different pitch from the thread 36 in supporting lug 34. A set screw 39 extends through mounting plate 28 and into nut member 37 to prevent relative movement of said nut member 37 with respect to mounting plate 28.

A plurality of metal disks 40 and friction disks 41 are alternately arranged between support 30 and supporting lug 33 and between support 30 and supporting lug 34.

A spindle 42 has a threaded portion 43 which is adapted to engage the thread 36 of supporting lug 34 and also has a threaded portion 44 which is adapted to engage the threaded portion 38 of nut member 37. Spindle 42 has round portions 45 and 46 which are adapted to rotate within the axial openings 31 and 32 of supports 29 and 30, respectively.

A pair of winged members 47 are pivoted to the end of spindle 25 while a pair of winged members 48 are pivoted to the end of spindle 42. These pairs of winged members are for the purpose of facilitating rotation of the respective spindles 25 and 42.

In order to render the mounting plate 28 more resilient and in order to permit supporting lugs 33 and 34 to be moved with respect to each other, a slit 49 is provided in mounting plate 28.

A bolt 50 having a winged head 51 extends through mounting plate 28 for the attachment of the apparatus to be supported. A guide plate 52 is adjustably attached to the side of mounting plate 28 by means of a pair of bolts 53 which pass through slots 54 of guide plate 52. A rod 55 is threaded into mounting plate 28 and is provided with a knob 56.

It will be noted that the advantages of the present invention are evident from a consideration of the tightening action at either of the joints. For instance, rotation of spindle 25 will cause relative movement in the same direction between spindle 25, head plate 10 and top plate 18 because the threaded portions 26 and 27 of spindle 25 are of the same hand. However, since threaded portion 26 is of different pitch from threaded portion 27, the rate of relative movement between spindle 25 and head plate 10 will be different than the rate of relative movement between spindle 25 and top plate 18. The difference in these rates of relative movement represents the rate at which the members are moving in an axial direction toward each other to present the differential tightening action for gradual increase of the frictional engagement between the metal elements and friction elements.

The differential action of the spindle may be more readily understood by a consideration of a specific example. Assume that threaded portion 16 of head plate 10 and threaded portion 26 of spindle 25 have a pitch so that 16 threads per inch are provided on the spindle and that the 20 threaded portion 22 of nut member 20 and the threaded portion 27 of spindle 25 have a pitch so that 18 threads per inch are provided. Consequently, upon imparting one complete turn to spindle 25, the spindle 25 moves a distance of 0.0625 inch with respect to head plate 10 and a distance of 0.0555 with respect to nut member 20 and top plate 18. Since these movements are both in the same direction, head plate 10 and top plate 18 will be moved toward or away from each other by the difference or 0.007 inch, which movement could otherwise only be accomplished by the employment of threaded members having a pitch equal to 143 threads per inch. Thus, it will be seen that a very gradual relative movement between a pair of members may be accomplished even though relatively coarse threads are used and that the friction drag between the members may be very gradually regulated.

The principle of the invention for delicate adjustment of the friction drag between the members is applicable as long as there is any difference between the pitches of the threads used. However, the invention is practiced to greatest advantage when there is only a slight difference, such as one or two threads per inch between the threads employed.

Since other modifications of the invention may be readily designed, the present disclosure is to be construed in an illustrative sense and limited only by the appended claims.

Having now particularly described my invention, what I desire to secure by Letters Patent of the United States and what I claim is:

1. In a tripod head, the combination with a pair of body members, and a plurality of friction elements between said members in surface contact with each other and with said body members, of a connecting means including a spindle engaging one of said body members, including a bushing for abutting the other of said body members and engaged by said spindle for axial adjustment with respect to said one body member, and including a connection between said bushing and said one body member to prevent relative rotation therebetween.

2. In a tripod head, the combination with a pair of body members one of which is provided with a threaded bore, and a plurality of friction elements between said members in surface contact with each other and with said body members, of a connecting means including a threaded spindle engaging the threaded bore of said one body member, including also a bushing abutting the other of said body members and provided with a threaded hole for receiving said spindle, and including further a connection between said bushing and said one body member to prevent relative rotation therebetween.

3. In a tripod head, the combination with a pair of body members one of which is provided with a threaded bore, and a plurality of friction elements between said members, of a connecting means between said body members including a spindle in threaded engagement with the threaded bore of said one body member, including also a bushing which is in threaded engagement with said spindle and which abuts the other body member to maintain a predetermined axial spacing between said body members, and including further a pin and notch connection between said bushing and said one body member to prevent relative rotation but to permit axial adjustment therebetween.

4. In a tripod head, the combination with a pair of plate members, one of which is provided with a threaded bore and the other of which is provided with an opening, and a plurality of friction elements between said members in surface contact with each other and with said plate members and each provided with a centrally located hole, of a threaded bushing within the opening of said other plate member and having a shoulder engaging the same, a threaded spindle engaging said bushing and the threaded bore of said one plate member and extending through the holes of said friction elements for varying the axial pressure of said plate members on said friction elements, and a connection between said bushing and said one body to prevent relative rotation therebetween.

5. In a tripod head, the combination with a pair of body members each having a pair of spaced supports which are provided with holes, one of said body members being provided with a slot between the supports and having the hole in one of said supports threaded, and a plurality of friction elements between said supports in surface contact with each other and with said supports and each provided with an axial opening, of a threaded bushing adjacent the other support of the first-mentioned body member and connected to said body member to move therewith, and a threaded spindle engaging said threaded hole of the support on the first-mentioned body member and said threaded bushing, extending through the axial openings of said friction elements, and for varying the axial pressure on said friction elements.

OTTO WITTEL.

CERTIFICATE OF CORRECTION.

Patent No. 2,047,241.

July 14, 1936.

OTTO WITTEL.

It is hereby certified that error appears in the printed specification of the above numbered patent requiring correction as follows: Page 3, second column, line 7, claim 4, after the word "body" insert member; and that the said Letters Patent should be read with this correction therein that the same may conform to the record of the case in the Patent Office.

Signed and sealed this 29th day of September, A. D. 1936.

Henry Van Arsdale (Seal)

Acting Commissioner of Patents.